United States Patent [19]

Murakami et al.

[11] 4,349,594
[45] Sep. 14, 1982

[54] WOVEN ARTICLE

[75] Inventors: Shinichi Murakami, Hatano; Kuniaki Okumi, Mitaka, both of Japan

[73] Assignee: Nissan Motor Co., Ltd., Yokohama, Japan

[21] Appl. No.: 230,235

[22] Filed: Feb. 2, 1981

[30] Foreign Application Priority Data

Feb. 7, 1980 [JP] Japan ............................. 55-13400[U]

[51] Int. Cl.³ .............................................. B32B 3/10
[52] U.S. Cl. ..................... 428/43; 428/136; 428/224; 428/134; 156/252
[58] Field of Search ..................... 428/43, 64, 65, 66, 428/58, 63, 131, 134, 137, 224, 136; 156/98, 252; 206/620; 248/DIG. 9

[56] References Cited

U.S. PATENT DOCUMENTS 2,266,958 12/1941 Corbin .................................. 428/43
2,909,234 10/1959 Belk .................................... 180/90.6

FOREIGN PATENT DOCUMENTS 689325 9/1930 France .

Primary Examiner—George F. Lesmes
Assistant Examiner—Alexander S. Thomas
Attorney, Agent, or Firm—James C. Wray

[57] ABSTRACT

A woven article (1), such as a carpet for a vehicle compartment, is provided with a removable portion (7) to form an opening (8) when some optional component is to be passed therethrough. The opening is partly circumscribed by a plurality of first slits (2a to 2d) which are spaced from each other. At least one second slit (4a to 4d) is further formed outwardly or inwardly of the contour of the opening in an overlapping relationship with two neighboring first slits. Substantially all the warps (5) and wefts (6) extending across the opening intersects with at least one of the slits to provide an uninterrupted opening of desired shape.

7 Claims, 9 Drawing Figures

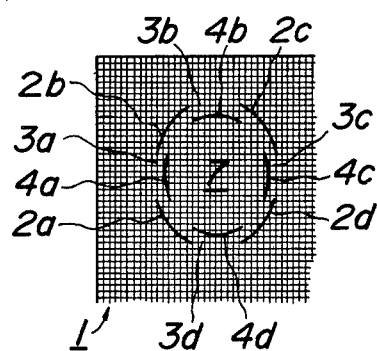
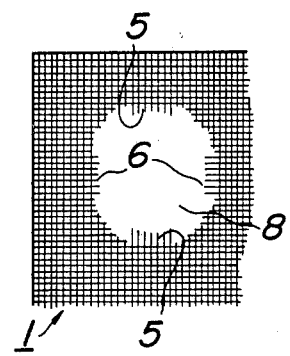
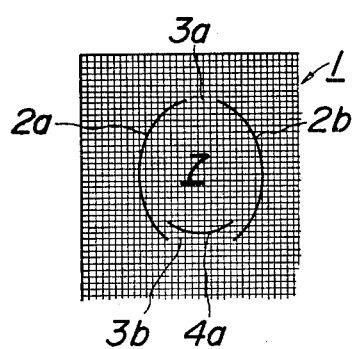
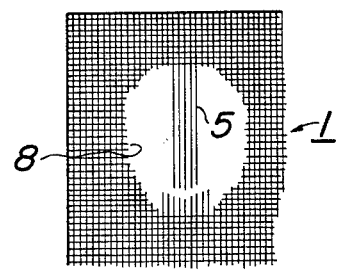

WOVEN ARTICLE

BACKGROUND OF THE INVENTION

1. Field of the Invention

The present invention relates to a woven article, such as a carpet for a vehicle compartment, which includes mutually woven yarns, i.e. wefts and warps, and may be formed with an opening, if necessary, to pass an optional component therethrough.

2. Description of the Prior Art

Such a woven article is shown in FIGS. 1A and 1B. The article 1 includes warps 5 and wefts 6, and is conventionally formed with a plurality of cutting lines 2a to 2d in the form of slits, which are aligned on a contour of the opening to be formed, and separated from each other leaving bridge-like connections 3a to 3d therebetween. By manually exerting pressure, warps and wefts extending between neighbouring slits 2a to 2d can be removed. However, warps and wefts extending between opposite bridge-like connections 3a to 3d are left connected across the opening to be formed (FIG. 1B). Thus, a complete opening cannot be formed without cutting the remaining yarns manually or by using a suitable cutting blade. Such an operation is troublesome and time consuming.

SUMMARY OF THE INVENTION

Therefore, it is an object of the present invention to provide a woven article of the type mentioned above, which can be formed with a complete opening, if necessary, in a very simple and positive manner.

According to the present invention, there is provided a woven article consisting of mutually woven warps and wefts, in which an opening having a closed contour can be formed optionally, said article being formed with a plurality of first slits extending along the contour and spaced from each other, wherein the article is further formed with at least one second slit which is offset outwardly or inwardly of the contour of the opening in an overlapping relationship with two neighboring first slits in the circumferential direction of the opening, the first and second slits being so arranged that any one of the warps and wefts extending across the opening to be formed intersects with at least one of the slits.

With the above arrangement, each of the warps and wefts extending across the opening to be formed has one or two free ends at the intersection with the slits, thus defining a readily removable portion corresponding to the opening. Cutting blades are not required to form a complete opening. All what is necessary is just to manually exert pressure to remove the removable portion. An opening having a desired shape can be formed in a very simple manner in short a time, and the periphery of the opening has a refined appearance.

BRIEF DESCRIPTION OF THE DRAWINGS

In the drawings:

FIG. 1A is a plan view showing the abovementioned conventional woven article;

FIG. 1B is a plan view of the article shown in FIG. 1A, in which an opening is formed incompletely;

FIG. 2 is a plan view showing the woven article according to a first embodiment of the present invention;

FIG. 3A is a plan view of the article shown in FIG. 2, which is formed with a complete opening;

FIG. 3B is a plan view of a portion of the article shown in FIG. 2, which is removed when the opening is formed;

FIG. 4 is a plan view of the woven article according to a second embodiment of the present invention;

FIG. 5 is a plan view of the article shown in FIG. 4, which is formed with a complete opening;

FIG. 6 is a plan view of the woven article according to a third embodiment of the present invention; and FIG. 7 is a plan view of the article shown in FIG. 6, which is formed with a complete opening.

DETAILED EXPLANATION OF THE PREFERRED EMBODIMENTS

Referring now to FIG. 2, there is shown a woven article according to the first embodiment of the present invention. As in the article shown in FIG. 1A, the article 1 according to the present invention is formed with a plurality of first slits 2a to 2d which are aligned on a contour of the opening 8 to be formed, and separated from each other. In this embodiment, the article 1 is further formed with a plurality of second slits 4a to 4d which are slightly offset outward from the bridge-like connections 3a to 3d between the first slits 2a to 2d. The second slits 4a to 4d are arranged such that each end portion of the second slits 4a to 4d overlaps the end portion of neighboring ones of the first slits 2a to 2d in the circumferential direction of the opening, i.e. in the direction of the warps 5 and/or wefts 6. Consequently, the first and second slits 2a to 2d, 4a to 4d cooperate to completely surround the opening to be formed. This means that each yarn extending across the opening to be formed necessarily intersects with two slits 2a, 2b; 4b; 4d; 2c, 2d; 2b, 2c; 4a, 4c; 2a, 2d on opposite sides of the opening thus defining a removable portion 7. On the other hand, yarns extending across the spaces between the bridge-like connctions 3a to 3d and the slits 4a to 4d without intersecting with the slits consist of warps 5 only or wefts 6 only, which are maintained connected with the remaining portion of the article 1. The latter yarns and the yarns of the removable portion 7 are woven with each other in the abovementioned spaces. In order to prevent undesirable removal of the portion 7 or formation of the opening, the abovementioned spaced should have a sufficient surface area. In other words, the distance between the neighboring first slits 2a to 2d, i.e. the length of the bridge-like connections 3a to 3d, and the distance between the connections 3a to 3d and the second slits 4a to 4d i.e. the width of the spaces, are so determined as to provide a sufficient frictional resistance between the yarns of the removable portion 7 and the yarns of the remaining portion of the article 1. When the article 1 on the rear surface is coated with a layer of synthetic resin material, the distance between the slits can be made smaller.

When the woven article 1 is to be formed with the opening 8 to pass therethrough an optional component, the portion 7 is manually applied with pressure. By this, the yarns of the portion 7 in the vicinity of the second slits 4a to 4d are separated from the yarns of the remaining portion of the article extending inside of the second slits 4a to 4d against the frictional resistance therebetween. As shown in FIG. 3A, thus formed opening 8 has its periphery partly formed by the warps 5 only and partly by the wefts 6 only, which extend substantially along the contour of the uninterrupted opening 8 having a desired shape. Correspondingly, as shown in FIG. 3B, the removed portion 7 includes a periphery partly formed by the warps 5 only or by wefts 6 only, which project outwardly of the portion 7.

FIGS. 4 and 5 show the second embodiment of the present invention, wherein the second slits 4a to 4d are formed slightly inside of the contour of the opening to be formed, on which the first slits 2a to 2d are aligned. In this case, the opening 8 formed by removing the portion 7 has a periphery partly defined by warps 5 only and partly by wefts 6 only, which project slightly inwards of the contour for the length corresponding to the distance between the first and second slits 2a to 2d, 4a to 4d. Those yarns do not disturb passage of an optional component through the opening 8, since they have free inner ends which automatically conform with the cross-sectional shape of the optional component.

In the embodiments described above, the entire contour of the opening 8 to be formed is completely surrounded by the first and second slits. But, the present invention is not limited to such an arrangement. For example, as shown in FIG. 6, the article 1 may be formed with a pair of relatively long first slits 2a, 2b which are aligned on the contour of the opening, and a single second slit 4a disposed inside or outside of the contour. In this case, by removing the portion 7 of the article 1, an opening 8 is formed which appears to be divided into two semi-circular shape. However, each of the warps 5 extending across the opening from the bridge-like connection 3a has a free end formed by the second slit 4a. Thus, the warps 5 at the center of the opening 8 can be freely displaced toward the periphery of the opening when passing an optional part therethrough.

It will be appreciated that, according to the present invention, the woven article is formed with a plurality of first slits substantially aligned on the contour of the opening to be optionally formed, and with at least one second slit between at least one pair of the first slits. The second slit is in overlapping relation with the first slits in the circumferential direction of the opening, and offset outwardly or inwardly of the contour. By this, a complete opening can be formed, if necessary, without using cutting blade, in a very simple manner, and the thus obtained opening is not disturbed by the yarns extending across the opening.

What is claimed is:

1. A woven article comprising mutually woven warps and wefts, in which an opening having a closed contour can be formed optionally without cutting or tearing by the application of pressure only, said article being formed with a plurality of first slits extending along the contour and spaced from each other, wherein the article is further formed with at least one second slit which is offset outwardly or inwardly of the contour of the opening in an overlapping relationship with two neighboring first slits in the circumferential direction of the opening, the first and second slits being so arranged that any one of the warps and wefts extending across the opening to be formed intersects with at least one of the slits.

2. A woven article comprising mutually woven warps and wefts, in which an opening having a closed contour can be formed optionally, said article being formed with a plurality of first slits extending along the contour and spaced from each other, wherein the article is further formed with at least one second slit which is offset outwardly or inwardly of the contour of the opening in an overlapping relationship with two neighboring first slits in the circumferential direction of the opening, the first and second slits being so arranged that any one of the warps and wefts extending across the opening to be formed intersects with at least one of the slits, and wherein the portion of the article defined by two neighboring first slits and one second slit therebetween has a sufficient width and/or length such that warps or wefts forming said portion frictionally retain wefts or warps forming part of the periphery of a portion to be removed to form the opening.

3. The article as claimed in claims 1 or 2, wherein the article is formed with a plurality of second slits arranged alternately with the first slits in the circumferential direction of the opening to be formed, the first and second slits cooperating with each other to surround substantially the entire circumference of the contour.

4. The article as claimed in claim 3, wherein the second slits are formed inwardly of the contour of the opening to be formed.

5. The article as claimed in claim 4, wherein each of the second slits extends substantially in the direction of warps or wefts.

6. The article as claimed in claim 3, wherein the second slits are formed outwardly of the contour of the opening to be formed.

7. The article as claimed in claim 6, wherein each of the second slits extends substantially in the direction of warps or wefts.

* * * * *